(12) United States Patent
McQueen (10) Patent No.: US 6,698,658 B2
(45) Date of Patent: Mar. 2, 2004

(54) METHOD AND APPARATUS TO PREVENT REPORTING MULTIPLE READS OF OPTICAL CODED ITEMS

(75) Inventor: Alexander M. McQueen, Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/905,042

(22) Filed: Jul. 12, 2001

(65) Prior Publication Data
US 2003/0010824 A1 Jan. 16, 2003

(51) Int. Cl.[7] .................................................. G06K 7/10
(52) U.S. Cl. ......................... 235/462.14; 235/462.01; 235/462.28
(58) Field of Search .......................................... 235/462

(56) References Cited

U.S. PATENT DOCUMENTS 6,206,286 B1 * 3/2001 Watanabe et al. ...... 235/462.01

* cited by examiner

Primary Examiner—Thien M. Le
Assistant Examiner—Dan Hess
(74) Attorney, Agent, or Firm—Stoel Rives LLP

(57) ABSTRACT

A scanner comprising a data reader integrated with a weigh scale includes a processor that recognizes specific types of optical codes. In a preferred embodiment, when a weighable item is read by the data reader, a fixed delay timer, which prevents multiple reporting of the same item data before the timer expires, is not allowed to expire until after the item is removed from the weigh scale. In an alternative embodiment, the timer is set for one of several possible delay times depending on the type of symbol being read. The timer is not allowed to expire until the most recently reported data is no longer observed by the reader. Thus, the likelihood that multiple reads of the same symbol will be reported is greatly reduced.

30 Claims, 6 Drawing Sheets

METHOD AND APPARATUS TO PREVENT REPORTING MULTIPLE READS OF OPTICAL CODED ITEMS

BACKGROUND OF THE INVENTION

Labels bearing information in any of a number of different optical code formats are commonly affixed to products, packaging, or other items and are used in many applications. It is common to encode retail product identification information in an optical code or bar code format on a product package or a label affixed to a product or package. Optical code symbols are also used on a broad range of retail packages for check-out and inventory purposes. A scanner, located at the check-out station of a retail establishment for example, is used to scan an optical code label to obtain product identification data for use by a host, such as an associated point-of-sale computer system.

In certain systems, multiple items are brought by the customer to the checkout counter, and the checkout clerk (or the customer) passes the item through the "read volume" of the scanner. The scanner reads the bar code and typically emits an audible tone indicating a successful read. The bar code data is then reported to the host.

Many retail checkout scanners include a fixed delay timer, which prevents multiple reporting of the bar code data. One such scanner is the Duet scanner, available from PSC Inc. of Eugene, Oreg. The fixed delay timer is activated when the scanner reads a bar code and reports the corresponding item data to the host. The timer is then restarted each time that the scanner reads the same bar code before the timer expires. When this occurs, data associated with the item is not reported to the host a second time. Thus, the item data is only reported multiple times if the timer expires before the bar code is read an additional time.

Many retail checkout scanners also include an integrated weigh scale for weighing certain items that are priced by weight ("weighable items"), such as produce. One such scanner is the Magellan® scanner-scale, also available from PSC Inc. With the advent of bar codes or optical codes that are placed on food items and weighable items, a unique situation is created at the point of sale wherein the codes are contained within the scanner's read volume for an extended period of time. The extra time may be required while the items are being weighed and/or because the items may be placed within translucent bags which make reading more difficult. During this time, an optical code may be visible and then not visible to the scanner several times, due to movement of the items, movement of the semi-transparent bags containing the items, or other causes. Thus, even though it remains in the read volume, the optical code might be unreadable (or not visible) for longer than the timer delay. A similar situation may arise with smaller hard to read optical codes, such as those utilizing reduced space symbology ("RSS"). Because an RSS symbol in the form used on produce stickers is relatively difficult to read, it may be read once and then remain unreadable for longer than the timer delay, if an item is scanned slowly. In these situations, if the bar code subsequently becomes readable again, the scanner reports the additional read to the host. This reporting of the same item data multiple times is an unacceptable condition for the system.

SUMMARY OF THE INVENTION

The present invention is directed to a system for and a method of preventing the reporting of multiple reads of optical code data at the point of sale, particularly for codes affixed to weighable items and food items.

In a preferred configuration, a data reader is integrated with a weigh scale, and further includes a processor that recognizes specific characteristics or types of codes used for weighable items, produce items, etc. Based on the characteristics or type of code being read, the fixed delay timer is modified to increase the likelihood that multiple reads of the same optical code will not be reported to the system host. In this embodiment, the fixed delay timer is set for a longer expiration time for weighable items, produce items, and/or items bearing difficult to read optical codes. The expiration time may vary per item, per class of items, or per some other criteria. As a result, the likelihood that multiple reads of the same optical code will be reported is greatly reduced.

In another preferred configuration, when a weighable item is recognized by the processor, the fixed delay timer is not allowed to expire until after the item is removed from the weigh scale and the expiration time elapses. Thus, the scanner will not report multiple reads of the same optical code while the item remains on the weigh scale.

DETAILED DESCRIPTION OF PREFERRED EMBODIMENTS

Preferred embodiments will now be described with reference to the drawings. For ease of reference, any reference numeral identifying an element in one figure will represent the same element in any other figure.

Figure 1:
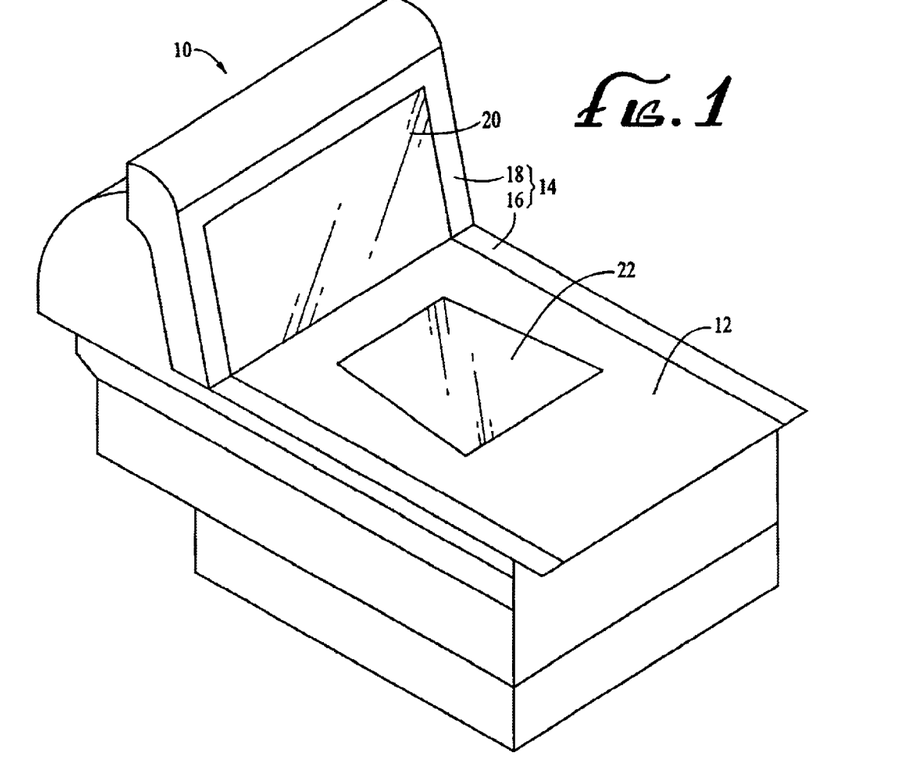
FIG. 1 is a perspective view of a scanner-scale according to a preferred embodiment.

FIG. 1 is a perspective view of a scanner 10 according to a preferred embodiment. The scanner 10 comprises a data reader integrated with a weigh scale comprising a weigh platter 12 used for weighing retail items at the point-of-sale. The scanner 10 includes a housing 14 with a lower horizontal housing portion 16 and an upper housing portion 18. The scanner 10 has two windows through which scan beams may pass, namely an upper window 20 arranged in a generally vertical plane, and a lower window 22 arranged in a generally horizontal plane. The scanner 10 is preferably mounted inside a countertop.

Figures 2, 2A:
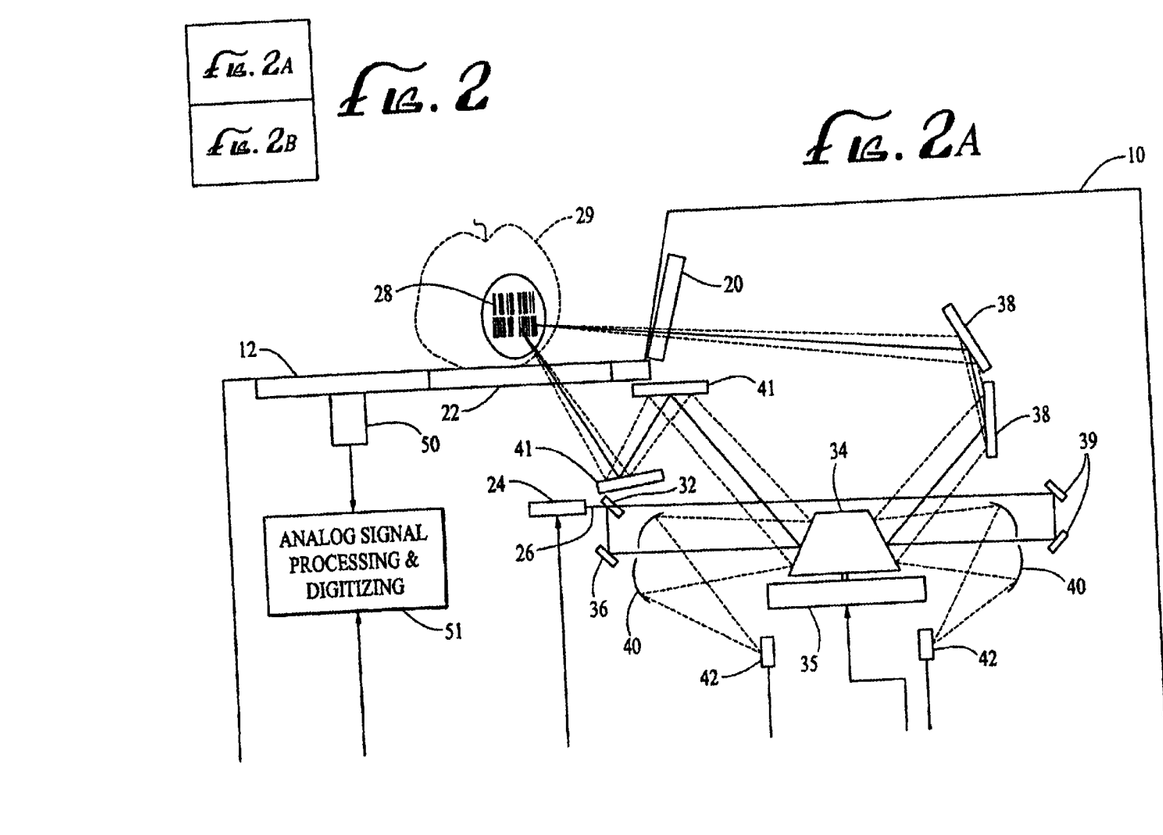
FIG. 2 is a side-sectional schematic view of the scanner-scale of FIG. 1.
Figure 2B:
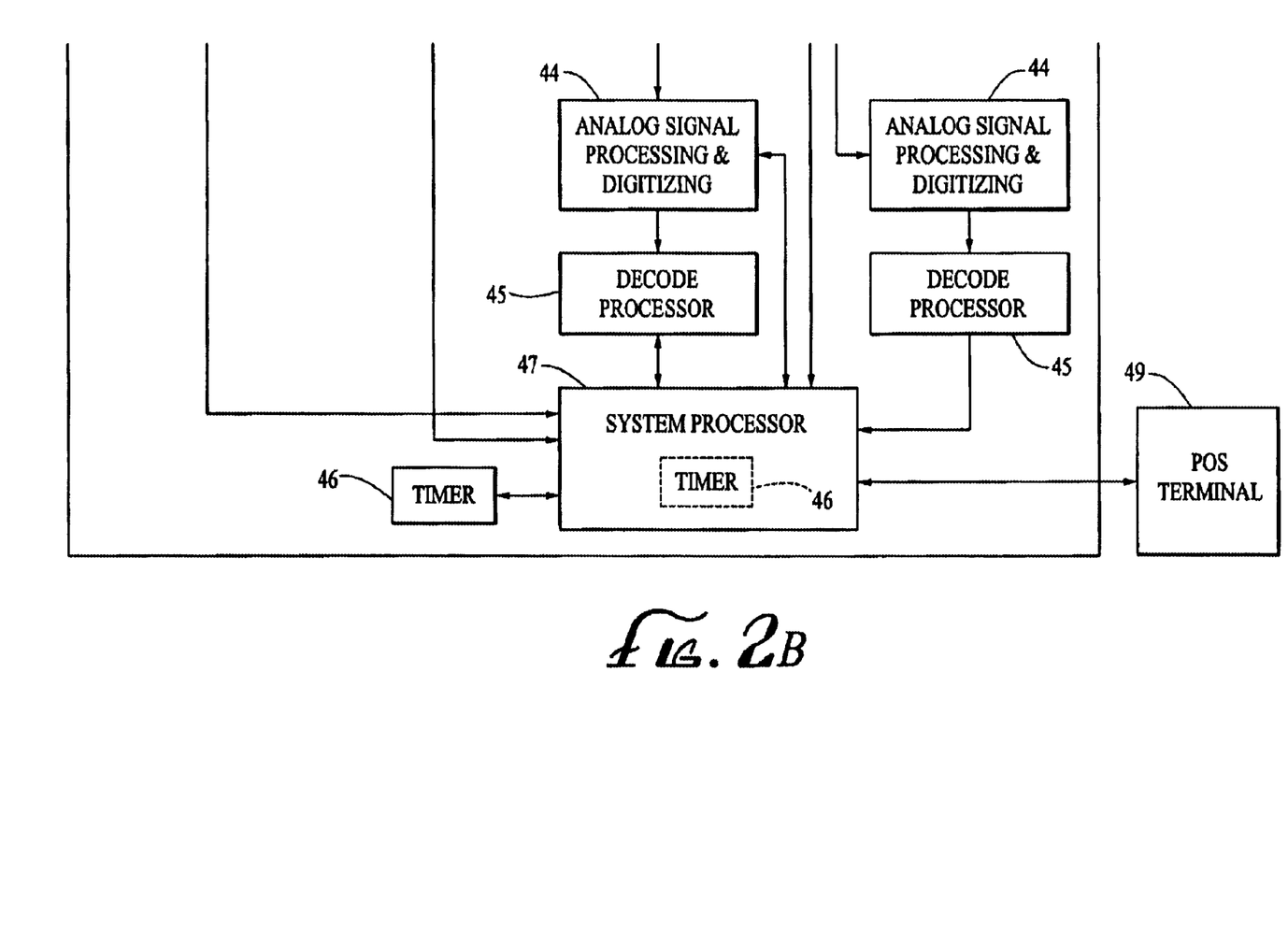

FIG. 2 is a side-sectional schematic view of the scanner 10 illustrated in FIG. 1. The scanner 10 may comprise any combination of components suitable for scanning optical codes such as bar codes, industrial symbols, alphanumeric characters, or other indicia for object recognition. Details of a two-window scanner-scale are disclosed in U.S. Pat. No. 5,705,802, hereby incorporated by reference. The scanner-scale also preferably includes an integrated two-plane weigh platter as disclosed in U.S. Pat. No. 5,834,708, hereby incorporated by reference.

The scanner 10 includes a light source 24, such as a laser diode or other suitable light emitter, for generating a laser beam 26 toward an object to be scanned, shown in this figure as an optical code 28. The optical code 28 is affixed to a retail item, such as the piece of fruit 29 shown in phantom.

The laser beam 26 is directed toward a beam splitter 32. The beam splitter 32 reflects a portion of the beam 26 toward a fold mirror 36 which then directs the beam through a collection optic 40 and toward a scanning mechanism, such as a rotating polygon mirror 34 coupled to a motor 35. The beam splitter 32 also transmits a portion of the beam 26, allowing it to pass to fold mirrors 39 whereupon it is redirected through another collection optic 40 and on to another side of the polygon mirror 34. Alternatively, multiple laser diodes may be used to generate multiple laser beams.

The rotating polygon mirror 34 scans a first set of beams off of a plurality of horizontal pattern mirrors 41 to direct a plurality of scan lines into a scan volume through the horizontal window 22. Similarly, the rotating polygon mirror 34 scans another set of beams off of a plurality of vertical pattern mirrors 38 to direct a plurality of scan lines into a scan volume through the vertical window 20. Alternatively, the beams may be directed through only a horizontal or a vertical window. The scanned beams are preferably directed toward the optical code 28 from several directions to increase the read volume of the scanner 10. One example of a scanner capable of scanning an item from several directions is the PSC Magellan® scanner/scale.

Still referring to FIG. 2, return light (shown as dotted lines) reflected from the optical code 28 is preferably directed along incoming optical paths parallel to the outgoing optical paths of the scanned beams. The return light is collected by the collection optics 40, which may be lenses, mirrors, or other optical collectors, and directed or focused onto one or more photodetectors 42. The photodetectors 42 convert the return signals impinging thereon into electrical signals that are sent to first signal processors 44. The first signal processors 44 generally convert the electrical signals into digital pulse signals in which the widths and spacings between the pulses correspond to the widths of the bars and the spacings between the bars of the optical code 28. At least one decoder 45, typically a microprocessor, decodes the pulse signal to obtain the optical code information, which identifies the type of item being scanned. Item data is then sent to a system processor 47, which reports the data to a host, such as a cash register or POS terminal 49.

The weigh platter 12 rests on at least one load cell 50 in communication with a second signal processor 51, which registers the weight of items placed onto the platter 12. The second signal processor 51 sends item weight data to the system processor 47, which reports the item weight data to the host 49. The load cell 50/second signal processor 51 further informs the system processor 47 when an item is removed from the weigh platter 12 (or when the weight on the weigh platter 12 significantly changes).

The POS terminal 49 is capable of accessing an electronic lookup table containing item cost and weight data corresponding to information obtained from various optical codes. The lookup table includes cost and weight data for each coded item sold in a store (with the exception of items bearing codes that have the cost and weight data embedded therein). For non-weighable items, the lookup table contains data identifying the cost of those items. For items priced by weight ("weighable items"), the lookup table contains data identifying the price-per-unit weight of those items. For example, if peaches cost 99 cents per pound, the lookup table contains data reflecting that price-per-unit weight information. Thus, when the scanner 10 reads an optical code, the lookup table is accessed to obtain cost and/or weight data for the corresponding item. For weighable items, the item cost is computed by multiplying the price-per-unit weight data found in the lookup table by the weight of the item registered by the weigh platter 12. For example, if peaches cost 99 cents per pound, and two pounds of peaches are placed onto the weigh platter 12, the item cost is calculated as 99 cents per pound multiplied by two pounds, or $1.98.

The scanner 10 further includes a timer 46 in communication with the system processor 47 for preventing the reporting of multiple reads of an optical code to the host 49. Alternatively, the timer 46 may reside inside the system processor 47 (as shown by the dashed lines) and may be implemented in several ways. When an optical code is initially read, and the timer 46 is activated, the scanner 10 is prevented from reporting the item identification data an additional time before the timer 46 expires. If the scanner 10 reads the same optical code data before the timer 46 expires, the timer 46 restarts and the item identification data is not reported. If the scanner 10 reads a new optical code, or if the timer 46 expires and the scanner 10 then reads the original optical code again, the item identification data corresponding to the new read is reported to the host 49.

Typically, a different type of optical code, or a special identifier included in the code, distinguishes weighable items, such as produce, from non-weighable items, such as packaged food items. The system processor 47 recognizes the type of symbol or special identifier being read by the scanner 10 and informs the timer 46 to operate accordingly, as further described below.

Figures 3, 3A:
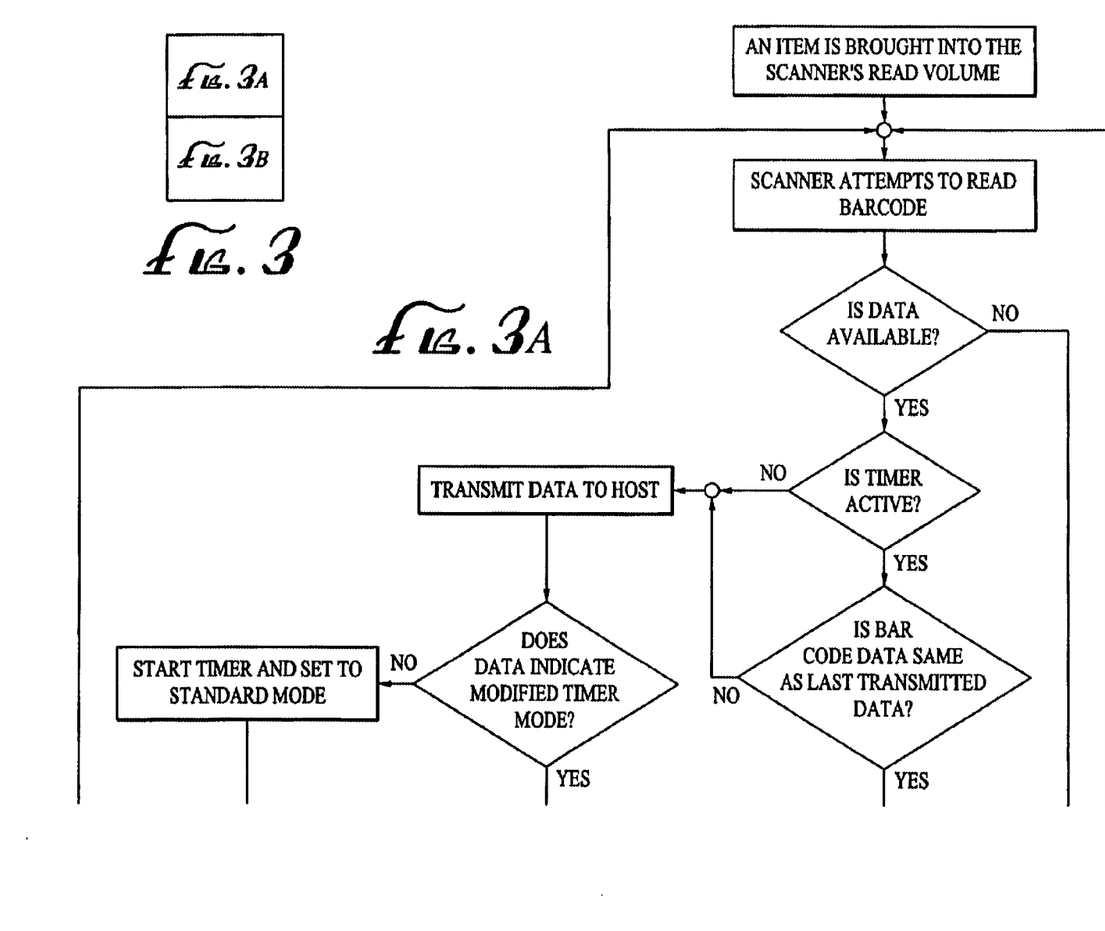
FIG. 3 is a flow chart illustrating how the scanner-scale operates according to a preferred embodiment.
Figure 3B:
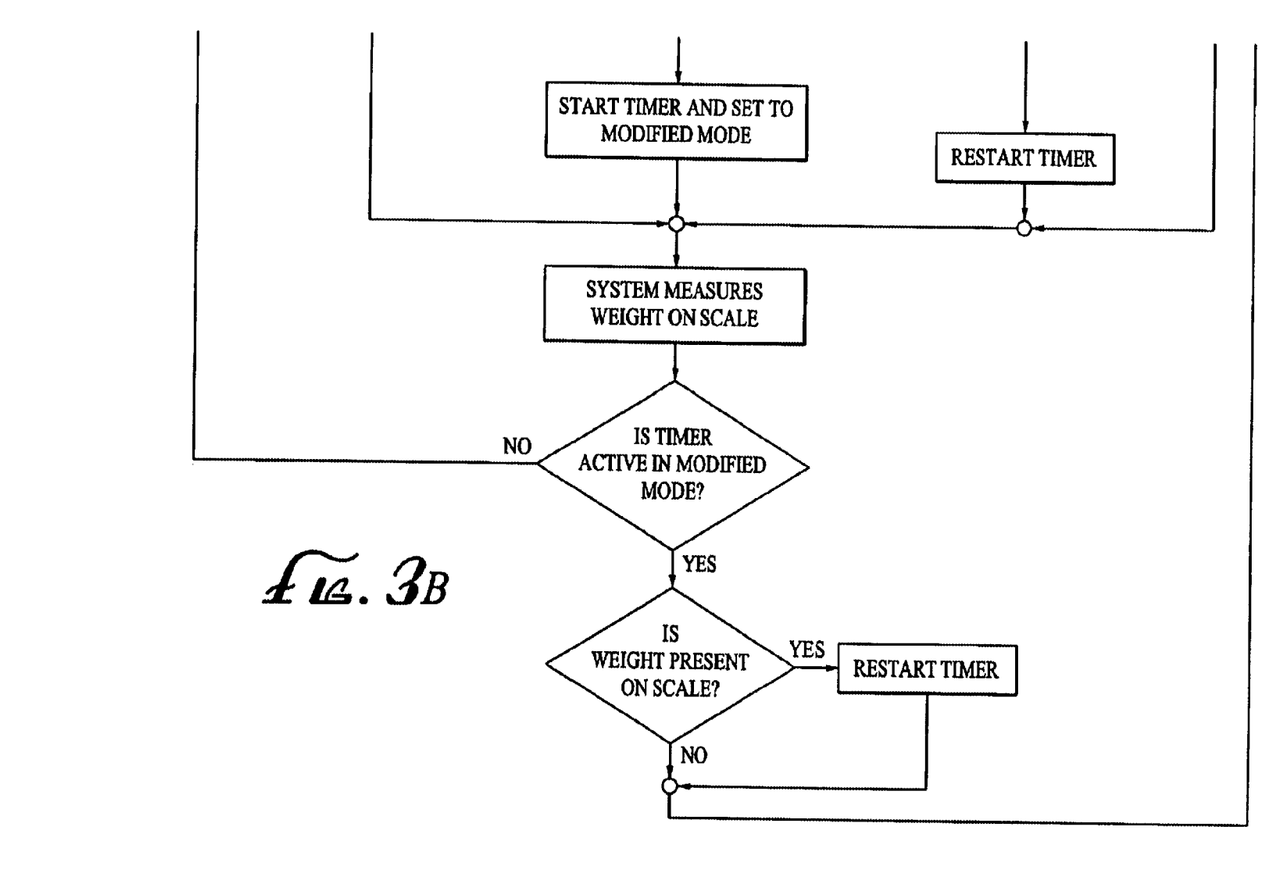

FIG. 3 is a flowchart illustrating operation of the scanner 10, according to a preferred embodiment. An item bearing an optical code is moved through the read volume of the scanner 10 and, if the item is weighable, is placed onto the weigh platter 12. The scanner 10 attempts to read the bar code information, and if data is available the system processor 47 determines whether the multiple read timer 46 is active from previous data. If the timer is not already active, the data is sent directly to the POS terminal 49. Subsequently, the system processor determines whether the item requires a modified timer delay setting (hereafter referred to as "modified mode") or a standard timer delay setting (hereafter referred to as "standard mode"). The timer is then set for the appropriate mode and started with the applicable delay. The standard delay time is generally in the range of 350–650 milliseconds, and is preferably in the range of 400–600 milliseconds. The modified delay time is generally in the range of 650 milliseconds to ten seconds, and preferably in the range of one second to five seconds.

If the timer was already active from previous data, the new data is compared to the last data transmitted to the POS terminal. If the data is the same, then the timer is "restarted", meaning that the timer starts timing again from zero elapsed time towards its predetermined delay setting.

After the bar code data processing is complete, the data provided by the weigh scale is examined. Measurement of weight on the scale is used for transactional purposes as well as for the purpose of the present invention, and thus will take place whether or not the system's multiple read timer is running in modified mode or not.

If the timer is running in modified mode, a determination is made as to whether there is weight on the scale above some minimum noise threshold. If there is weight on the scale, the timer is restarted. If no weight is present, the timer continues to run. Based upon this scheme, if the item bearing the bar code is left on the scale, the timer will continue to be restarted, preventing the same bar code data from being reported multiple times. As an alternative to this method, the number of restarts in modified mode may be limited to avoid problems which may be caused by offsets to the scale's zero point.

If one item is being removed from the weigh platter 12, and another item is placed onto the weigh platter 12 before the first item is completely removed, the system will in most cases instantly read the new item because the bar code data will typically be different from the previous item, and thus the timer will not affect reporting of the data. If the second item is placed on the scale before the first item is fully removed, and the bar code data is the same, then the feature of limiting the overall delay time or number of restarts of the timer will keep the second item from being indefinitely prevented from having its data transmitted. Additionally, the scale signal processor 51 preferably informs the system processor 47 when an item is completely removed from the weigh platter 12, or when the weight on the weigh platter 12 significantly changes, so that the delay timer will continue running when the first item is substantially removed from the weigh platter 12.

Figures 4, 5:
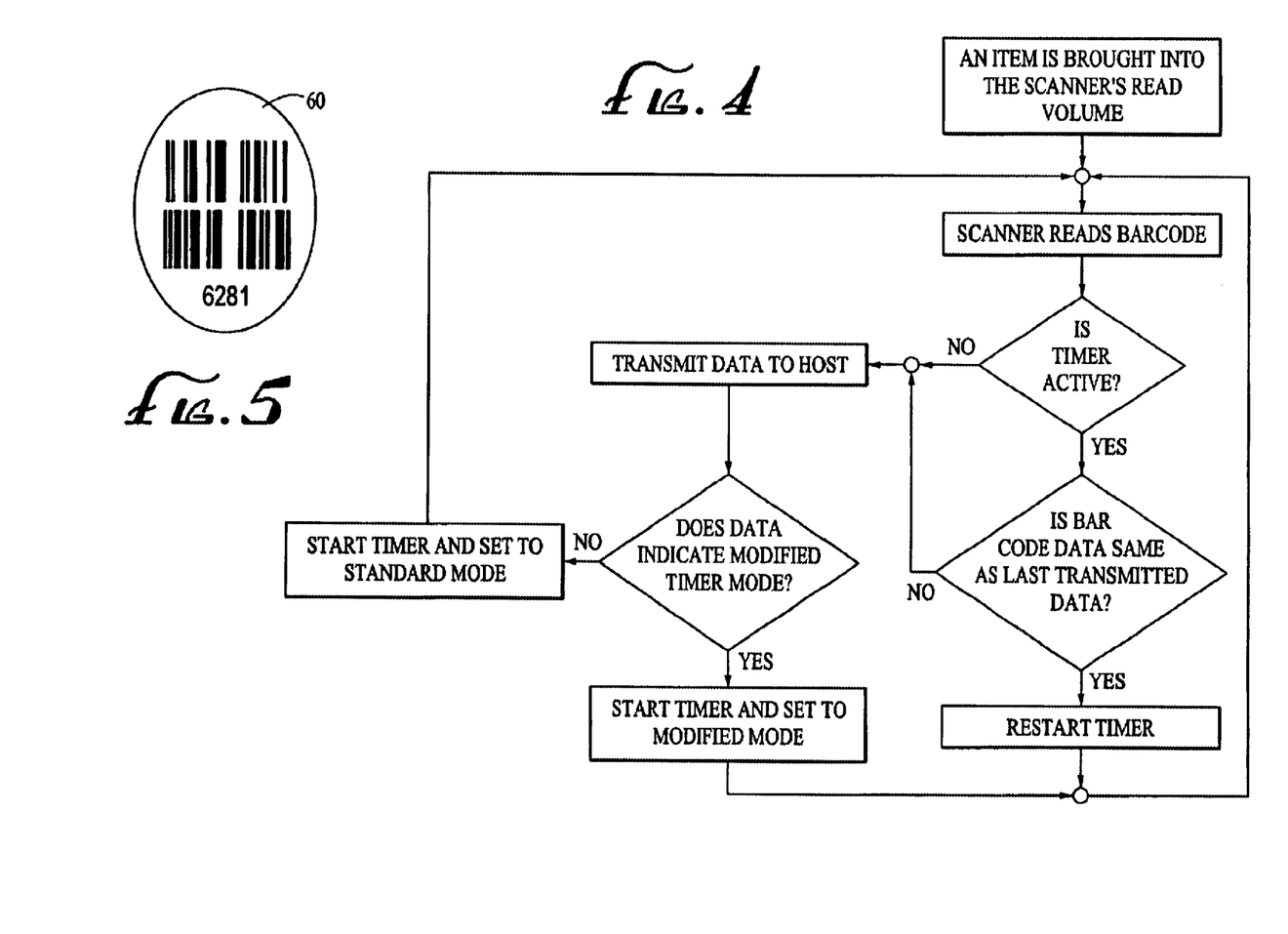
FIG. 4 is a flow chart illustrating how the scanner-scale operates according to an alternative preferred embodiment.
FIG. 5 is a reduced space symbology (RSS) optical code.

FIG. 4 is a flowchart illustrating operation of the scanner 10 according to an alternative preferred embodiment. In this embodiment, the delay timer is activated after the data reader reads and transmits any type of optical code. Simultaneously, the system processor 47 determines what type of code is being read (or processes actual data embedded in the optical code itself). The delay timer is then set for a delay time that corresponds to the type of optical code or embedded data being read. The delay time may differ for each individual item in a store, for different classes of items, or may vary based on some other criteria. For example, when an optical code corresponding to a weighable item is read, the delay time may be set for a longer duration than when an optical code corresponding to a non-weighable item is read. By utilizing a longer delay time for weighable items, the likelihood that item identification data will be reported multiple times is reduced. If the same optical code is read before the expiration of the timer, the timer resets to the delay time specified for the type of item being read.

Additionally, if the optical code is small and difficult to read, such as a stacked RSS code 60 (shown in FIG. 5), which is often used on produce, the delay time may be set for a longer duration than that set for a standard optical code. The reason for the longer delay time is that, if an item bearing an RSS code is scanned slowly, the RSS code may become unreadable for longer than the delay time after the code is read a first time. Thus, the delay timer is advantageously set for a longer duration than that set for a more easily readable standard optical code. In such a case, the timer may be set for the same delay time as that set for weighable items, or for any other suitable delay time. The delay time may also differ for each type of item bearing an RSS code.

The delay timer may be modified in a similar manner for other types of optical codes, particularly those used on produce, because such items are often placed into translucent bags through which it is difficult to read the codes, and which are often moved around on the weigh platter 12. Accordingly, a longer delay time may be beneficial for these types of optical codes in order to prevent the reporting of multiple reads.

The scanner described in any of the above embodiments may modify the timer's delay time through any of several different methods. Some possible methods for determining the appropriate delay time are as follows:

the scanner may compare the scanned optical code data to an internally stored list of items which require a modified timer setting;

the scanner may receive special information from the POS terminal about specific types of scanned items;

the POS terminal may provide a complete list of items and corresponding timer settings, which may be downloaded to the scanner before transactions occur;

the POS terminal may provide information on a per-read basis after optical code data is received from the scanner;

the scanner may "learn" which items require an alternative delay time by associating optical code data corresponding to an item with a request for item weight from the POS terminal, and use such information to update an internal list of items requiring modified delay times;

the delay time may be increased based upon the relative frequency of optical code "segments" or pieces of complete code data which are received by the scanner.

While embodiments and applications of the present invention have been shown and described, it would be apparent to one skilled in the art that modifications are possible without departing from the inventive concepts herein. The invention, therefore, is not to be restricted except in the spirit of the claims that follow.

What is claimed is:

1. A method of reading a symbol on an item, the symbol constituting one of a plurality of symbol types, comprising the steps of obtaining item identification data by reading the symbol with a data reader;

determining symbol type;

reporting the item identification data to a host;

selecting a delay time based on the symbol type and/or on data embedded in the symbol;

activating a timer set to expire after the selected delay time elapses;

preventing subsequent reporting of the item identification data before the timer expires.

2. A method according to claim 1 wherein the delay time is longer for symbol types corresponding to weighable items than for symbol types corresponding to non-weighable items.

3. A method according to claim 1 wherein the delay time is longer for symbol types corresponding to produce items than for symbol types corresponding to other items.

4. A method according to claim 1 further comprising the step of restarting the timer if the symbol is read before the timer expires.

5. A method according to claim 1 further comprising the step of reporting the item identification data to the host if the symbol is read after the timer expires.

6. A method according to claim 1 further comprising reporting subsequent identification data if the subsequent identification data is different than the identification data just previously reported even if the timer has not expired.

7. A method according to claim 1 further comprising if the timer has not expired, resetting the timer if the subsequent identification data is the same as the identification data just previously reported.

8. A method of reading a symbol on a weighable item, comprising the steps of providing a data reader with an integrated weigh scale;

obtaining item identification data by reading the symbol with the data reader;

activating a timer set to expire after a delay time elapses;

reporting the item identification data to a host;

obtaining weight of the item by weighing the item on the weigh scale;

preventing subsequent reporting of the item identification data to the host while the item remains on the weigh scale;

removing the item from the weigh scale;

preventing subsequent reporting of the item identification data before the timer expires.

9. A method according to claim 8 further comprising the step of modifying the delay time based on the type of symbol read and/or on data embedded in the symbol.

10. A method according to claim 8 wherein the delay time is in a range of 350 milliseconds to 10 seconds.

11. A method according to claim 8 further comprising the step of restarting the timer if the symbol is read again before the timer expires.

12. A method according to claim 8 further comprising the step of reporting the item identification data to the host if the symbol is read again after the timer expires.

13. A method according to claim 8 further comprising the step of continuously restarting the timer while the item remains on the weigh scale.

14. A method according to claim 8 further comprising the step of recognizing that the item has been at least substantially removed from the weigh scale before allowing the timer to expire.

15. A method according to claim 8 further comprising reporting subsequent identification data if the subsequent identification data is different than the identification data just previously reported even if the timer has not expired.

16. A method according to claim 8 further comprising if the timer has not expired, resetting the timer if the subsequent identification data is the same as the identification data just previously reported.

17. A method according to claim 8 wherein the step of preventing subsequent reporting of the item identification data to the host while the item remains on the weigh scale comprises restarting the timer while the item remains on the weigh scale.

18. A method of reading a symbol on an item, comprising the steps of providing a data reader with an integrated weigh scale;

obtaining item identification data by reading the symbol with the data reader;

determining whether the item is a weighable item depending upon whether the symbol having been read corresponds to a weighable item or a non-weighable item;

activating a timer set to expire after a delay time elapses;

reporting the item identification data to a host;

if in the step of determining it is determined that the item is a weighable item, obtaining weight of the item by weighing the item on the weigh scale;

restarting the timer while the item remains at least partially on the weigh scale;

preventing subsequent reporting of the item identification data before the timer expires.

19. A method of reading a symbol on an item comprising the steps of providing a data reader with an integrated weigh scale;

obtaining item identification data by reading the symbol with the data reader;

determining whether the symbol corresponds to a weighable item or a non-weighable item;

activating a timer set to expire after a delay time elapses;

reporting the item identification data to a host;

obtaining weight of the item by weighing the item on the weigh scale if the item is a weighable item;

preventing subsequent reporting of the item identification data before the timer expires;

preventing the timer from expiring until after the item is removed from the weigh scale and the delay time elapses if the symbol corresponds to a weighable item.

20. A method of reading a symbol on an item comprising the steps of providing a data reader with an integrated weigh scale;

obtaining item identification data by reading the symbol with the data reader;

determining whether the symbol corresponds to a weighable item or a non-weighable item;

activating a timer set to expire after a delay time elapses;

reporting the item identification data to a host;

obtaining weight of the item by weighing the item on the weigh scale if the item is a weighable item;

preventing subsequent reporting of the item identification data before the timer expires;

wherein the timer is set for a longer delay time for weighable items than for non-weighable items.

21. A system for reading a symbol on an item, the symbol constituting one of a plurality of symbol types, comprising a data reader for reading the symbol;

a weigh scale integrated with the data reader for weighing the item;

a system processor in the data reader for determining the symbol type;

a timer in communication with the system processor for preventing reporting of subsequent reads of the symbol that occur before the timer expires, the timer settable for different expiration times based on the symbol type and/or on data embedded in the symbol.

22. A system according to claim 21 wherein the timer is adapted to restart while an item remains on the weigh scale.

23. A system according to claim 21 wherein the timer is set for a longer expiration time for symbol types corresponding to weighable items than for symbol types corresponding to non-weighable items.

24. A system according to claim 21 wherein the timer is set for a longer expiration time for symbol types corresponding to produce items than for other symbol types.

25. A system according to claim 21 wherein the timer is restartable, the timer restarting if the data reader reads the symbol again before the timer expires.

26. A system according to claim 21 further comprising a load cell in communication with the weigh scale for obtaining weight of the item and for recognizing when the item is removed from the weigh scale.

27. A system according to claim 26 further comprising a signal processor for transmitting data from the load cell to the system processor.

28. A method of reading items, comprising the steps of providing a reader with a weigh scale;

passing an item to be read into a read volume of the reader and onto the weigh scale;

identifying the item with the reader and reporting to a host;

determining whether the item has remained on the scale;

preventing reporting of a subsequent read of a same item to the host while the item remains at least partly on the weigh scale.

29. A method according to claim 28 wherein the step of preventing reporting comprises upon identifying an item, activating a timer set to expire after a delay time elapses;

resetting the timer while the item is determined to remain on the weigh scale;

preventing reporting of a subsequent read of a same item if the timer has not expired.

30. A method of reading a symbol on an item with a data reader, the item being passed through a read volume defined over a weigh scale, comprising the steps of obtaining item identification data by reading the symbol with the data reader;

activating a timer set to expire after a delay time elapses;

communicating the item identification data;

determining from weight measured by the weigh scale whether at least a portion of the item remains on the weigh scale;

resetting the timer if it is determined that at least a portion of the item remains on the weigh scale;

preventing communicating of a subsequent read of a same item if the timer has not expired.

\* \* \* \* \*

UNITED STATES PATENT AND TRADEMARK OFFICE
CERTIFICATE OF CORRECTION

PATENT NO. : 6,698,658 B2
DATED : March 2, 2004
INVENTOR(S) : Alexander M. McQueen It is certified that error appears in the above-identified patent and that said Letters Patent is hereby corrected as shown below:

<u>Title page,</u>
Item [56], References Cited, should read:
-- U.S. PATENT DOCUMENTS

| | | | |
|---|---|---|---|
| 5,260,553 | 11/1993 | Rockstein et al. | |
| 5,410,108 | 4/1995 | Williams et al. | |
| 5,475,207 | 12/1995 | Bobba et al. | |
| 5,491,328 | 2/1996 | Rando | |
| 5,705,502 | 1/1998 | Bobba et al. | |
| 5,834,708 | 11/1998 | Svetal et al. | |
| 5,837,988 | 11/1998 | Bobba et al. | |
| 5,883,370 | 3/1999 | Walker et al. | |
| 5,992,744 | 11/1999 | Smith et al. | |
| 6,047,889 | 4/2000 | Williams et al. | |
| 6.147,767 | 11/2000 | Petteruti et al. | |
| 6,189,784 B1 | 2/2001 | Williams et al. | |
| 6,206,286 B1 * | 3/2001 | Watanabe et al. | 235/462.01 |
| 6,354,630 B1 | 3/2002 | Zhang et al. | |
| 6,360,097 B1 | 3/2002 | Smith et al. | |
| 6,411,397 B2 | 6/2002 | Petteruti et al. --. | |

Signed and Sealed this

Tenth Day of August, 2004

JON W. DUDAS
*Acting Director of the United States Patent and Trademark Office*